United States Patent [19]
Van Roosmalen et al.

[11] Patent Number: 6,005,260
[45] Date of Patent: *Dec. 21, 1999

[54] NON-LINEAR SWITCHING ELEMENT OF AN ELECTRO-OPTICAL DISPLAY DEVICE WITH METALLIC PROTECTIVE LAYER

[75] Inventors: Alfred J. Van Roosmalen; Jan H. W. Kuntzel, both of Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,337

[22] Filed: Jan. 31, 1997

Related U.S. Application Data

[62] Division of application No. 08/314,562, Sep. 28, 1994, abandoned.

[30] Foreign Application Priority Data

Oct. 19, 1993 [BE] Belgium ............................... 09301107

[51] Int. Cl.$^6$ .................................................. G02F 1/1343
[52] U.S. Cl. ......................... 257/59; 257/294; 257/298; 257/306; 257/307; 257/308; 257/528; 257/533; 257/535; 349/49; 349/50; 349/51; 438/396; 438/551; 438/553
[58] Field of Search ............................ 257/294, 59, 298, 257/307–308, 528, 533, 535; 349/49, 50, 51; 438/396, 551–553

[56] References Cited

U.S. PATENT DOCUMENTS

| | | | |
|---|---|---|---|
| 5,366,588 | 11/1994 | Scholten et al. | 216/101 |
| 5,521,731 | 5/1996 | Fukuyama et al. | 350/339 |
| 5,674,599 | 10/1997 | Yamada | 349/51 |

*Primary Examiner*—Fetsum Abraham
*Attorney, Agent, or Firm*—John C. Fox

[57] ABSTRACT

For contacting a non-linear switching element (10), for example for use in a display device (1), a metallic layer (14) is provided on a layer of non-linear resistive material by means of a low-energetic deposition technique. This layer may function as a contact but also as a protective layer when a contact metallization (15) is provided at a later stage.

6 Claims, 2 Drawing Sheets

NON-LINEAR SWITCHING ELEMENT OF AN ELECTRO-OPTICAL DISPLAY DEVICE WITH METALLIC PROTECTIVE LAYER

This is a division of application Ser. No. 08/314,562, filed Sep. 28, 1994, now abandoned.

BACKGROUND OF THE INVENTION

The invention relates to a display device comprising an electro-optical medium between two supporting plates which are located opposite each other and whose facing sides are provided with a plurality of column electrodes and row electrodes, respectively, while at least one of the supporting plates is provided with a plurality of picture electrodes which are connected to the row or column electrodes via non-linear switching elements, each non-linear switching element comprising a non-linear resistive material between a first and a second electrically conducting layer.

Display devices of this type are used, for example as display panels in measuring equipment, personal computers and television receivers.

The invention also relates to a non-linear switching element and to a method of manufacturing a non-linear switching element.

These non-linear switching elements may not only be used in said display devices but also, for example in circuits for pressure sensors or photosensitive panels.

A display device of this type is known from European Patent Application EP-A-0 202 092. The display device shown in this Application comprises a non-linear resistive element with a layer of non-linear resistive material, for example silicon oxide or silicon nitride between a conducting layer and a metal electrode. The metal electrode forms part of the row or column electrodes.

It has been found that the switching elements may exhibit a given leakage current after a period of time at a voltage of 0 V (or a small voltage which is much smaller than the threshold voltage). The picture elements associated with the switching elements lose their charge due to such a leakage current and the written picture contents are not maintained. The effective lifetime of these types of switching elements may thus be limited to 100 hours.

It is an object of the invention to obviate the above-mentioned problem as much as possible.

To this end a display device according to the invention is characterized in that the electrically conducting layer located at the side of the electro-optical medium is metallic and is separated from the non-linear resistive layer by a metallic protective layer.

The invention is based on the recognition that, upon later deposition of a conducting layer by means of, for example sputtering, the presence of the protective layer prevents locations on the surface of the layer of non-linear resistive material from being damaged in such a way that leakage currents occur at a later stage. To this end the metallic protective layer should be free from pinholes and discontinuities. This can be achieved by means of low-energetic deposition techniques such as, for example sputtering.

An electrically conducting metallic layer can then be provided on the protective layer, which metallic layer may be thicker and may be made of a low-ohmic material so that a satisfactory contact can be realised. Due to the presence of the protective layer, a sputtering energy or a sputtering rate which are higher than those for the protective layer can be used when this metallic conducting layer is being provided.

By providing the electrically conducting layer at a higher sputtering rate (for example, a factor of 5–10 higher), the manufacture may proceed more rapidly. For protecting the underlying layer of non-linear resistive material it is, however, sufficient that this material is contacted by means of a metallic layer which is obtained by using low-energetic deposition techniques. A further display device according to the invention is therefore characterized in that the electrically conducting layer located at the side of the electro-optical medium is provided by means of a low-energetic deposition technique.

If the protective layer comprises a high melting point material such as, for example molybdenum or a molybdenum alloy (for example, Mo—Ta, Mo—Ti, Mo—Si, Mo—Cr, Mo—V, Mo—Nb, Mo—W, Mo—Ta—Ti, Mo—Ta—Si, Mo—Ta—V, etc.), material of this protective layer is prevented from diffusing into the layer of non-linear resistive material, for example during subsequent process steps. The thickness of the protective layer is preferably at least 10 nm so as to prevent the occurrence of discontinuities and pinholes in the protective layer. The thickness is further dependent on the sputtering energy which is used when the conducting layer is being provided and is preferably chosen to be smaller than 100 nm (and 80 nm at lower sputtering energies).

The protective layer and a layer of conducting material which is deposited thereon may consist of the same material.

If the protective layer consists of a high melting point material, low melting point materials such as, for example aluminium, copper, silver and nickel-chromium, may alternatively be used for the conducting layer. In particular, low melting point well-conducting metals can be used which would diffuse into the nonlinear resistive material at a higher temperature during later process steps if the protective layer of high melting point metal were not used.

A first method of manufacturing, on a substrate, a non-linear switching element provided with a layer of non-linear resistive material between a first and a second electrically conducting layer is characterized in that after the provision of the first electrically conducting layer on the substrate 1) a layer of the non-linear resistive material is deposited on the substrate and on the first conducting layer;
2) a metallic protective layer is provided on the layer of non-linear resistive material;
3) the assembly is provided with a first mask;
4) the metallic protective layer and the layer of non-linear resistive material are patterned by means of the first mask;
5) a second layer of electrically conducting material is deposited on the assembly thus obtained at a deposition energy which is equal to or larger than that which is used for depositing the metallic protective layer, whereafter a second mask is provided, and
6) the second layer of electrically conducting material is patterned by means of the second mask.

In a second method the metallic protective layer and the layer of electrically conducting material are deposited directly after each other on a layer of patterned non-linear resistive material and subsequently jointly patterned.

In a further method only a metallic protective layer is provided by means of low-energetic deposition techniques.

These and other aspects of the invention will be apparent from and elucidated with reference to the embodiments described hereinafter.

BRIEF DESCRIPTION OF THE INVENTION

In the drawings

FIG. 1 is a cross-section of a part of a display device according to the invention, FIG. 2 is a plan view of a non-linear switching element according to the invention, while FIG. 3 is a cross-section taken on the line III—III in FIG. 2, and FIGS. 4a–h shows a non-linear switching element according to the invention during successive stages of manufacture.

The Figures are diagrammatic and not to scale; corresponding elements are generally denoted by the same reference numerals.

DETAILED DESCRIPTION OF THE PREFERRED EMBODIMENTS

Figure 1:
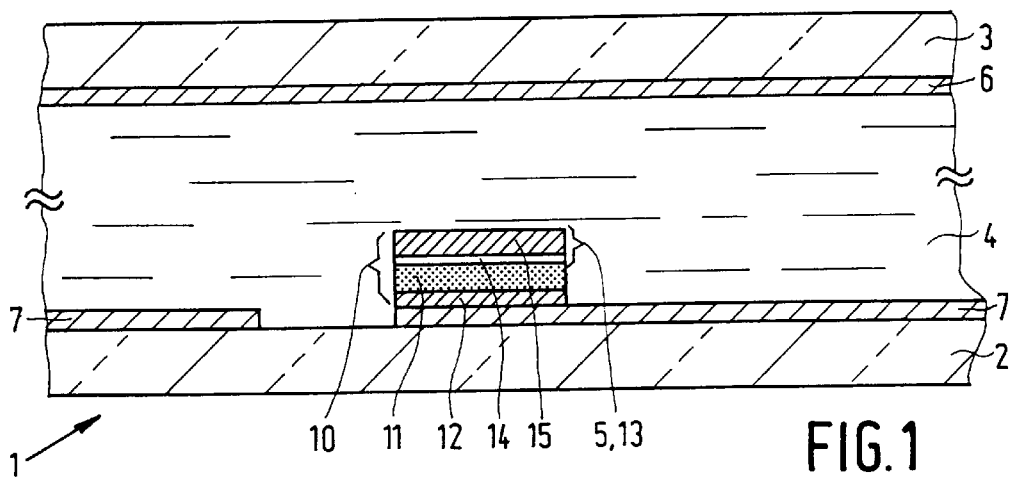

FIG. 1 is a cross-section of a part of a display device 1 according to the invention, for example a liquid crystal display device. Picture electrodes 7 of, for example indium-tin oxide (ITO) are realised on the supporting plate 2. These picture electrodes 7 define picture elements which are driven via a non-linear switching element 10 such as, for example a MIM (metal-isolator-metal). To this end the switching elements 10 are interconnected between the picture electrodes 7 and column electrodes 5 which, together with a system of row electrodes 6 drive the picture elements. The row electrodes 6 are present on a further supporting plate 3 which is located opposite the supporting plate 2 and are structured in such a way that, together with the picture electrodes 7 and the interposed electro-optical medium (in this case liquid crystal material 4), they define said picture elements.

The non-linear switching element 10 comprises a conducting layer 12 of, for example chromium. A layer of non-linear resistive material 11 is present between this first conducting layer 12 and a second conducting layer 13. This layer can be formed by means of (P)CVD ((plasma)chemical vapour deposition) or sputtering and may consist of silicon oxide, silicon nitride, silicon oxynitride, silicon carbide, germanium oxide, germanium nitride or germanium carbide. Said materials need not have a stoichiometric composition and are preferably doped with hydrogen. In this example amorphous non-stoichiometric hydrogen-doped silicon nitride ($\alpha$—$Si_x.N_y.H$) is used.

According to the invention the conducting layer 13 comprises a thin protective layer 14 of molybdenum having a thickness of approximately 50 nm at the side of the amorphous silicon nitride. This layer has such a thickness (between 10 and 100 nm and preferably between 20 and 80 nm) that the underlying non-linear resistive material can hardly be damaged when a subsequent conducting layer 15 is provided; the thickness of the protective layer 14 is sufficient for obtaining a closed layer which completely covers the underlying non-linear resistive material.

The protective layer 14 is coated with a further conducting layer 15 which, in this example, forms part of a column electrode and, if necessary, may consist of another material, for example aluminium for a satisfactory conductance in the column electrode.

When the same material (molybdenum) is used for the two sub-layers, the conditions during the provision by means of, for example sputtering are different due to the difference in the desired properties (sealing versus well-conducting). The two sub-layers then have a different structure, which is visible when using Transmission Electron Microscopy.

Figure 2:
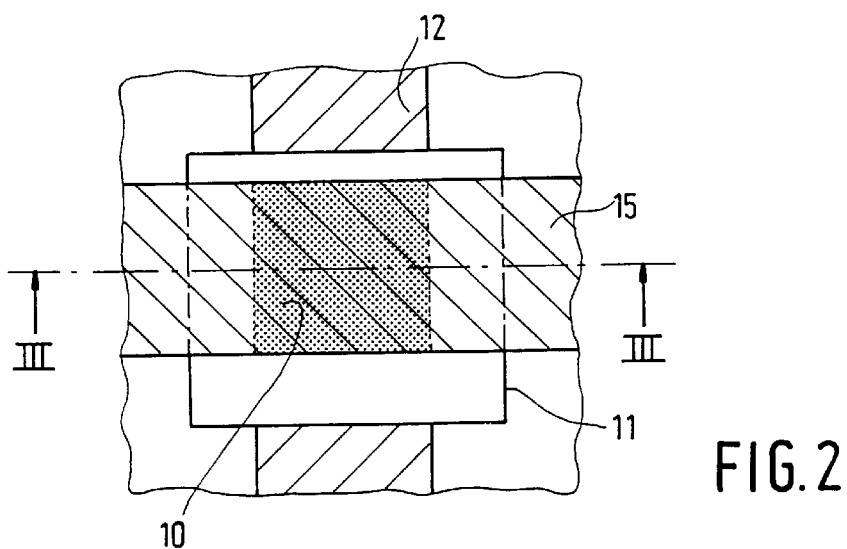
Figure 3:
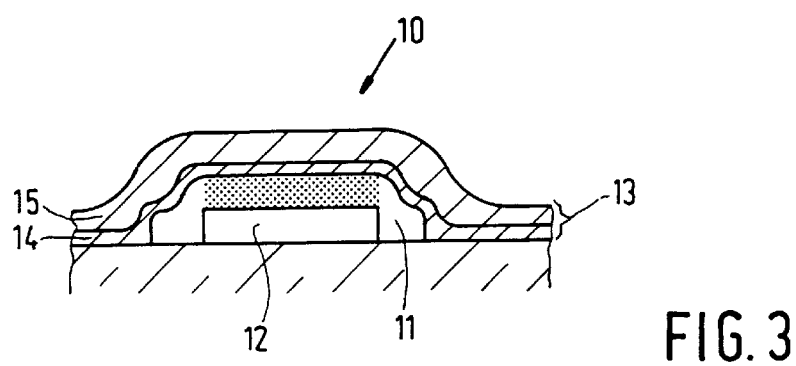

FIGS. 2 and 3 show a switching element on a glass plate 2. The switching element 10 (the MIM) is located at the area of the crossing of the conductors 12 of, for example chromium and the double layer 13, 14 of molybdenum in so far as there is non-linear resistive material 11 (indicated by dotted areas) at the location of the crossing.

Figure 4A:
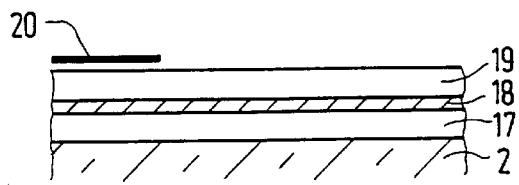

A non-linear switching element 10 in FIG. 1 can be manufactured as follows. The starting material is a supporting plate or substrate 1 of, for example glass or quartz on which a layer 17 of indium-tin oxide (ITO) is deposited, for example by means of sputtering, which layer is in its turn coated with a thin chromium layer 18 of approximately 35 nm which is also provided by means of sputtering. The assembly is subsequently coated with a layer of photoresist 19 on which a mask 20 is provided (FIG. 4a).

Figure 4B:
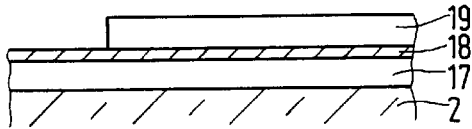
Figure 4C:
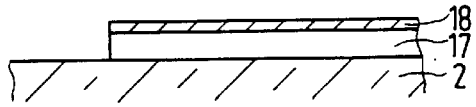

The photoresist layer 19 is exposed in patterns by means of the mask 20 and developed so that parts 19 of the photoresist are left behind (FIG. 4b). Said parts function as a mask during the subsequent etching of the chromium layer 18 and the ITO layer 17. This etching treatment is performed in, for example an acidified solution of cerium salt and a hydrochloric acid ferrochloride solution respectively. The device of FIG. 4c is then obtained (defined areas consisting of double layers 17, 18 of ITO and chromium).

Figure 4D:
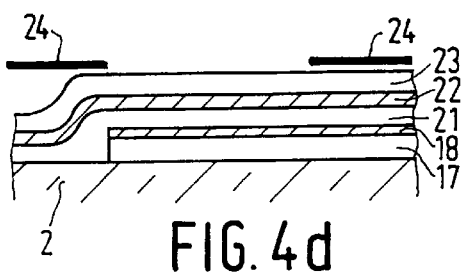
Figure 4D:

Subsequently, the assembly is coated, for example by means of (P)CVD, with a layer 21 of amorphous silicon nitride which is doped with hydrogen (or another non-linear resistive material), on which a thin layer 22, in this example of molybdenum, is deposited. The conditions of providing the layers (temperature, pressure, sputtering parameters such as power and voltage) are such that a dense layer is produced which protects the underlying amorphous silicon nitride from attack of the surface when a subsequent conducting layer is being provided. This layer 22 may be very thin and has a thickness of 50 nm in this example. At a layer thickness of less than 10 nm discontinuities may occur in the layer, while at a layer thickness of more than 100 nm said attack may occur. The layer thickness is preferably in the range between 20 and 80 nm. The assembly is subsequently coated again with a layer of photoresist 23 on which a mask 24 is provided (FIG. 4d).

Figure 4E:
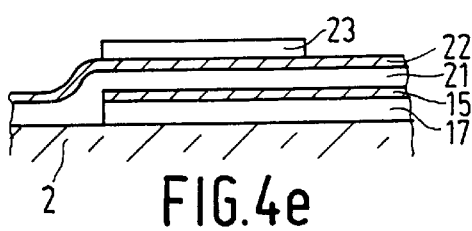
Figure 4E:
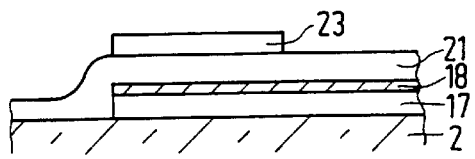
Figure 4F:
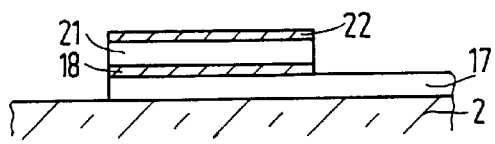
Figure 4F:
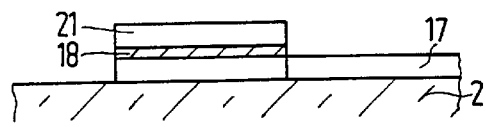
Figure 4G:
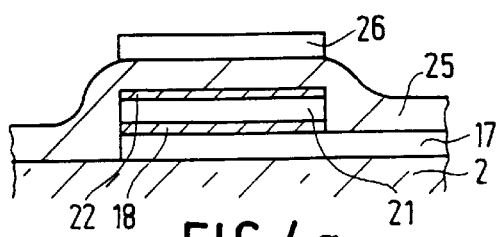
Figure 4G:
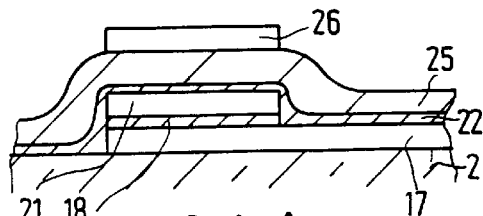

The photoresist layer 23 is again exposed in patterns by means of the mask 24 and developed so that parts 23 of the photoresist are left behind (FIG. 4e). Said parts function as a mask during the subsequent etching of the molybdenum layer 22 and the layer 21 of amorphous silicon nitride. This etching treatment is performed in, for example a fluorine-containing high frequency plasma, followed by an etching step so as to remove the chromium on the ITO layer at the location of the picture electrodes. The device of FIG. 4f is then obtained.

Figure 4H:
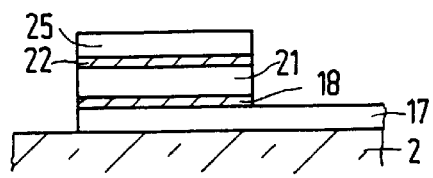

Subsequently a layer 25 of well-conducting material, preferably of metal and in this example of molybdenum having a thickness of approximately 250 nm is deposited. After patterned parts 26 of photoresist are provided in a similar manner as described hereinbefore (FIG. 4f), the (molybdenum) layer 25 is etched with this photoresist as a mask in, for example a bath based on phosphoric acid. The device of FIG. 4h is then obtained, with an amorphous silicon nitride layer between a conducting layer (lower contact) of a double layer of ITO and chromium and a conducting layer (upper contact) consisting of a layer 25 of molybdenum (in this example). According to the invention, a thin molybdenum layer 22 is present between the layer 25 and the amorphous silicon nitride layer 21. Since the layer 22 protects the underlying amorphous silicon nitride from detrimental influences of sputtering at a higher energy, the layer 25 can be provided at a higher energy, i.e. at higher sputtering rates. The sputtering rate may be raised, for example by a factor of 5 to 10 so as to expedite manufacture. However, it is not strictly necessary to raise the energy, because the amorphous silicon remains protected when a thicker layer 22 is provided at a low deposition energy, while, dependent on the application, the layer 22 is sufficient as an electric contact layer.

The molybdenum layer 22 may alternatively be provided after silicon nitride 21 has been deposited (FIG. 4d') and patterned (FIGS. 4e', 4f'). First, the thin molybdenum layer 22 and then the layer 25 are deposited on the defined areas 21, while different deposition conditions (sputtering parameters) can be chosen for the two sub-layers. The double layer thus obtained is then again patterned photolithographically.

The invention is of course not limited to the example shown, but several variations are possible within the scope of the invention. For example, the column electrode 15 may be present next to the picture electrode 7, in which case the protective layer 14 is present on the non-linear resistive material and extends below the column electrode. It is also possible to choose different (preferably) high melting point materials such as, for example tungsten, tantalum, titanium and their alloys for the protective layer adjoining the amorphous silicon nitride. As has been stated, variations are also possible in the composition of the non-linear resistive material as well as in the manufacturing methods and the etchants and process parameters used.

We claim:

1. A method of manufacturing, on a substrate, a non-linear switching element provided with a layer of a non-linear resistive material between a first and a second electrically conducting layers characterized in that after the provision of the first electrically conducting layer on the substrate 1) a layer of the non-linear resistive material is deposited on the substrate and on the first conducting layer;
   2) a metallic protective layer is provided on the layer of non-linear resistive material completely covering the layer of the non-linear resistive material;
   3) the assembly is provided with a first mask;
   4) the metallic protective layer and the layer of non-linear resistive material are patterned by means of the first mask;
   5) a second layer of electrically conducting material of a thickness greater than that of the metallic protective layer is deposited on the assembly thus obtained at a deposition energy which is equal to or larger than that which is used for depositing the metallic protective layer, whereafter a second mask is provided, and
   6) the second layer of electrically conducting material is patterned by means of the second mask.

2. A method as claimed in claim 1, characterized in that the deposition is performed by means of sputtering and the sputtering rate for the second layer of electrically conducting material is a factor of 5 to 10 higher than that for the metallic protective layer.

3. A method as claimed in claim 2, characterized in that the same material is used for the metallic protective layer and for the second layer of electrically conducting material.

4. The method as claimed in claim 1, characterized in that the metallic protective layer has a thickness of between about 10 nm and about 100 nm.

5. A method of manufacturing, on a substrate, a non-linear switching element provided with a layer of a non-linear resistive material between a first and a second electrically conducting layer, characterized in that after the provision of the first electrically conducting layer on the substrate 1) a layer of the non-linear resistive material is provided on the substrate and on the first conducting layer;
   2) the assembly is provided with a first mask;
   3) the layer of non-linear material is patterned by means of the first mask;
   4) a metallic protective layer, completely covering the resultant patterned layer of the non-linear resistive material, is deposited on the resultant patterned layer of non-linear resistive material, a second layer of electrically conducting material of a thickness greater than that of the metallic protective layer is deposited on the metallic protective layer, while for depositing the second layer of electrically conducting material a deposition energy is, used which is equal to or larger than that which is used for depositing the metallic protective layer, whereafter
   5) the assembly is provided with a second mask, and
   6) the double layer consisting of the metallic protective layer and the second layer of electrically conducting material is patterned by means of the second mask.

6. A method as claimed in claim 5, characterized in that the deposition is performed by means of sputtering and the sputtering rate for the second layer of electrically conducting material is a factor of 5 to 10 higher that that for the metallic protective layer.

* * * * *